US012734564B2

(12) United States Patent
Christensen

(10) Patent No.: US 12,734,564 B2
(45) Date of Patent: Sep. 15, 2026

(54) SCALABLE CABIN SYSTEM FOR SPOT PROCESSING OF A SURFACE, MOBILE CABIN, AND METHOD HERETO

(71) Applicant: WE LINK YOU APS, Støvring (DK)

(72) Inventor: Henrik Bro Christensen, Støvring (DK)

(73) Assignee: WE LINK YOU APS, Støvring (DK)

( * ) Notice: Subject to any disclaimer, the term of this patent is extended or adjusted under 35 U.S.C. 154(b) by 215 days.

(21) Appl. No.: 18/700,059

(22) PCT Filed: Oct. 13, 2022

(86) PCT No.: PCT/DK2022/050217
§ 371 (c)(1),
(2) Date: Apr. 10, 2024

(87) PCT Pub. No.: WO2023/061546
PCT Pub. Date: Apr. 20, 2023

(65) Prior Publication Data

US 2025/0235908 A1 Jul. 24, 2025

(30) Foreign Application Priority Data

Oct. 15, 2021 (DK) .......................... PA 2021 70512
Mar. 22, 2022 (DK) .......................... PA 2022 70129
Mar. 22, 2022 (DK) .......................... PA 2022 70131

(51) Int. Cl.
*B08B 15/02* (2006.01)
*B01D 53/04* (2006.01)

(52) U.S. Cl.
CPC ........ *B08B 15/023* (2013.01); *B01D 53/0407* (2013.01); *B01D 53/0454* (2013.01);
(Continued)

(58) Field of Classification Search
CPC ........... B08B 15/02–023; B05B 12/34; B05B 16/80–95; B01L 1/52; B24C 3/06; B01D 2259/455
(Continued)

(56) References Cited

U.S. PATENT DOCUMENTS 3,691,691 A * 9/1972 Smith ...................... B24C 3/20 451/89
4,375,740 A 3/1983 Brown
(Continued)

FOREIGN PATENT DOCUMENTS

CN 208824833 U 5/2019
CN 210434723 U 5/2020
(Continued)

OTHER PUBLICATIONS

International Search Report for PCT/DK2022/050217 mailed on Jan. 20, 2023.

(Continued)

*Primary Examiner* — Joseph A Dillon, Jr.
(74) *Attorney, Agent, or Firm* — Schmeiser Olsen PLLC

(57) ABSTRACT

A mobile cabin, application of the cabin, and a method for spot processing of a smaller area of a surface, on a car or other object is provided. The mobile cabin includes a first side open along an outlined edge area. Towards the open side, a covering sheet made from a flexible material can be can be brought against the surface which undergoes spot processing. The covering sheet is supplied with sealing compounds. The cabin further cabin air inlet and extraction, wheels, and one or more windows, provided for visual insight into the cabin, as well as arm access holes, supplied with flexible material for a tight fit around a person's arms. The mobile cabin takes up little space and is easy to transport and facilitates a spot processing, without a person
(Continued)

being required to stay inside the cabin itself during performance of the work.

14 Claims, 5 Drawing Sheets

(52) U.S. Cl.
CPC .. *B01D 2253/102* (2013.01); *B01D 2257/708* (2013.01); *B01D 2259/455* (2013.01)

(58) Field of Classification Search
USPC ............................ 55/385.2, 356; 451/89, 91
See application file for complete search history.

(56) References Cited

U.S. PATENT DOCUMENTS 4,682,448 A * 7/1987 Healey .................... E04G 23/00 135/900
4,732,592 A * 3/1988 Spengler ................. F24F 3/167 55/385.2
4,883,512 A * 11/1989 Griffis ................... B08B 15/026 55/467
4,909,815 A * 3/1990 Meyer .................... B01D 46/00 96/136
4,911,191 A * 3/1990 Bain ..................... E04G 21/243 135/900
5,062,871 A * 11/1991 Lemon, III .............. B25J 21/02 55/385.2
5,083,558 A * 1/1992 Thomas .................. F24F 3/163 128/202.16
5,090,972 A * 2/1992 Eller ..................... B08B 15/026 454/238
5,096,474 A * 3/1992 Miller, Jr. ............ B08B 15/026 55/385.2
5,279,631 A * 1/1994 Pingel ..................... B05B 16/90 118/DIG. 7
5,502,868 A 4/1996 Braendle
5,558,112 A * 9/1996 Strieter ................. B08B 15/026 135/900
5,593,470 A * 1/1997 Shagott ..................... A47L 5/38 55/357
5,762,664 A * 6/1998 Vross ..................... B01D 46/64 96/135
5,951,725 A * 9/1999 Vross ..................... B01D 46/00 55/357
6,383,242 B1 * 5/2002 Rogers ................... B01D 46/42 52/63
6,402,613 B1 * 6/2002 Teagle .................. F24F 1/0071 454/341
6,616,720 B1 * 9/2003 Smith ....................... F24F 8/10 55/385.2
6,783,563 B1 * 8/2004 Eckhoff ................. B01D 46/02 55/467
6,966,937 B2 * 11/2005 Yachi .................. A61G 10/005 134/201
7,008,304 B1 * 3/2006 Robinson .................. B04C 1/00 451/75
7,189,272 B2 * 3/2007 Cheng ..................... B05B 15/80 55/482
7,406,978 B2 * 8/2008 Mintie .................... E04H 15/50 135/900
8,931,626 B2 * 1/2015 Heim .................. B05B 13/0436 198/463.3
10,343,293 B1 7/2019 Taylor
10,577,810 B2 * 3/2020 Telleria ............... B05B 13/0431
10,639,686 B2 * 5/2020 Burgemeister ............ B08B 5/02
10,808,953 B2 * 10/2020 Hammers ................ B23K 9/16
11,103,887 B2 * 8/2021 Kendall .............. B05B 13/0405
11,351,566 B2 * 6/2022 Mariani .................. E04H 15/44
11,420,148 B2 * 8/2022 Christensen ........... B01D 53/30
12,145,164 B2 * 11/2024 Zimmerman ............ A62C 3/00
D1,073,978 S * 5/2025 Christensen ................... D25/32
2001/0045220 A1 11/2001 Fara
2002/0121196 A1 * 9/2002 Thakur .................. B01D 46/62 96/417
2008/0083333 A1 * 4/2008 Yokoi ................ B01D 46/0056 55/385.2
2010/0203261 A1 * 8/2010 Kirk ........................ B05B 15/80 427/559
2013/0012103 A1 1/2013 Daffner
2013/0303066 A1 * 11/2013 Waulters ............... E04H 1/1277 454/65
2018/0065135 A1 * 3/2018 Linares ................... B05B 14/40
2023/0218463 A1 * 7/2023 Kapila .................... F24F 8/108 600/21
2024/0131463 A1 * 4/2024 Jung ...................... B01D 46/10
2025/0135482 A1 * 5/2025 Christensen .............. B25B 5/14

FOREIGN PATENT DOCUMENTS

| | | | |
|---|---|---|---|
| CN | 211275200 | U | 8/2020 |
| CN | 213287380 | U | 5/2021 |
| DE | 202006016124 | U1 | 3/2007 |
| EP | 1 293 284 | A1 | 3/2003 |
| EP | 1319443 | A1 | 6/2003 |
| EP | 2 548 656 | A2 | 1/2013 |
| FR | 3 097 784 | A3 | 1/2021 |
| GB | 2424064 | A | 9/2006 |
| KR | 20210071887 | A | 6/2021 |
| KR | 2021 0092602 | A | 7/2021 |
| SE | 528772 | C2 | 2/2007 |
| WO | 2006/085061 | A1 | 8/2006 |

OTHER PUBLICATIONS

Written Opinion for PCT/DK2022/050217 mailed on Jan. 20, 2023.
Danish Search Report for PA 2022 70131 issued Aug. 11, 2022.
Danish Search Report for PA 2022 70129 issued Aug. 11, 2022.
Danish Search Report for PA 2022 70512 issued Mar. 15, 2022.

* cited by examiner

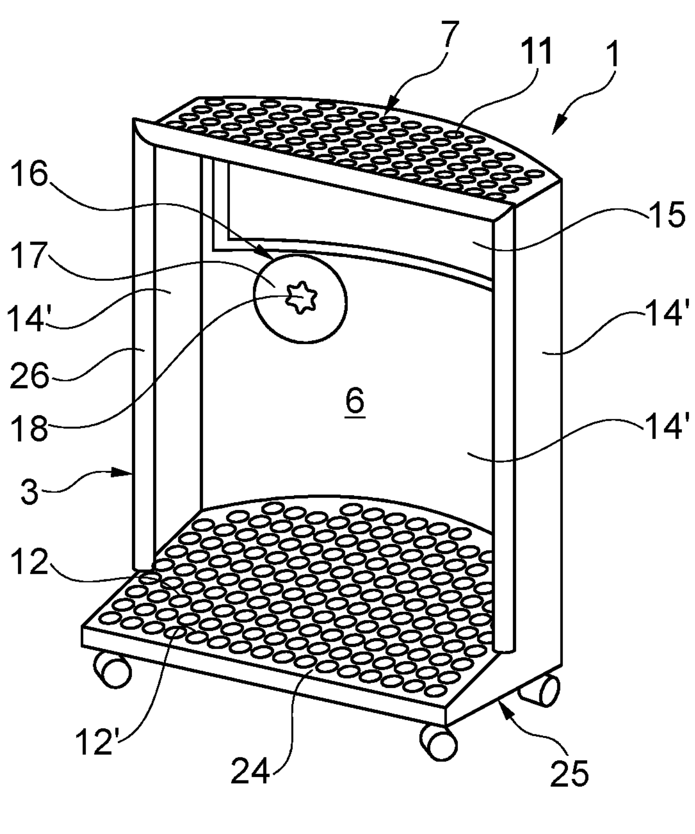
Fig. 7
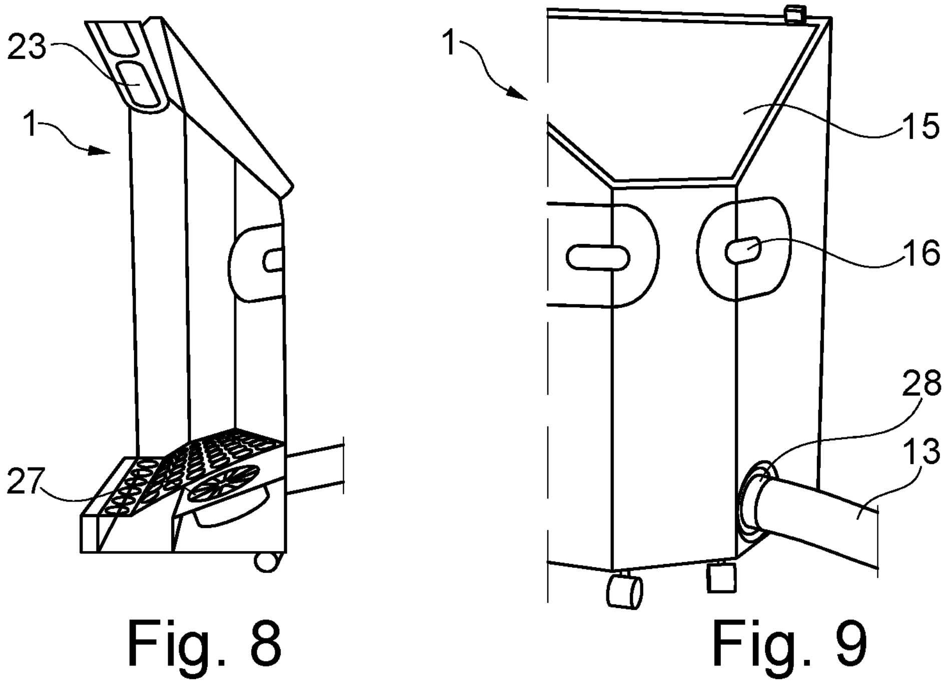
Fig. 8
Fig. 9

SCALABLE CABIN SYSTEM FOR SPOT PROCESSING OF A SURFACE, MOBILE CABIN, AND METHOD HERETO

CROSS-REFERENCE TO RELATED APPLICATIONS

This application claims priority to PCT Application No. PCT/DK2022/050217, having a filing date of Oct. 13, 2022, which is based DK Application No. PA 2022 70131, having a filing date of Mar. 22, 2022, and DK Application No. PA 2022 70129, having a filing date of Mar. 22, 2022, and DK Application No. PA 2021 70512, having a filing date of Oct. 15, 2021, the entire contents all of which are hereby incorporated by reference.

FIELD OF TECHNOLOGY

The following relates to a scalable cabin system for spot processing of a surface, a mobile cabin, application hereof along with a method for spot processing of an area of a surface, for example, on a car or other objects.

BACKGROUND

Embodiments of the present invention are developed in connection with surface processing, including surface treatment of a lesser or outlined area of a larger surface. Such a type of processing is referred to as spot treatment or spot processing.

Until now, spot processing or treatment such as spot painting of even smaller areas on a car, such as a bumper, door, wing, or similar, has occupied a paint cabin. The car is placed in the paint cabin, and areas that are not to be painted are covered up, while the smaller area that is to be painted undergoes spot painting. Throughout this procedure, the person carrying out the painting will stay inside the paint cabin and must wear safety equipment. The same method is employed for polishing and welding and similar spot processing.

The car thus occupies a full-sized cabin, and it is therefore, with regards to capacity, difficult to have a car undergo treatment in a traditional cabin for the purpose of repairing minor damages.

This has meant that spot processing often happens with a delay. Furthermore, such cases of spot processing become disproportionately expensive as they occupy an entire cabin, which could instead have processed an entire car. This is obviously a disadvantage, as there are typically numerous smaller damages that only require spot processing.

To utilise the capacity of traditional cabins there is a request for an alternative way of carrying out spot processing of surface parts on a car, where the use of a traditional cabin is not required.

SUMMARY

An aspect relates to a mobile cabin and a method for use of the mobile cabin for spot processing, and which can easily and effectively be utilised in connection with cars or other objects where only a part of the surface is to be processed.

A further aspect of embodiments of the invention is to indicate a scalable cabin system comprising the mobile cabin, likewise for spot processing. It furthermore an aspect to indicate application and method for use of the cabin system for spot processing.

According to embodiments of the present invention this is accomplished with a mobile cabin of the introductory mentioned type, characterised in that it comprises

- a cabin with sides, bottom, and top, where a first side is open and where a covering sheet made from a flexible material is assembled along an outlined edge area facing the open side, which can be brought into arrangement against a surface, where a smaller area of the surface is to undergo spot processing, which covering sheet at its free edge area has an edge area supplied with sealing compounds adapted to establish a sealing arrangement against the surface, which envelops the smaller area which is to undergo spot processing, and where the other sides comprise sidewalls,
- air inlet,
- cabin air extraction, adapted to be linked to an extraction system,
- wheels, which facilitates easy relocation of the cabin,
- windows, provided in at least one of the other sidewalls for visual insight into the cabin,
- arm access holes, provided in one or more of the other sidewalls and supplied with flexible material for a tight fit around a person's arms when standing outside of the cabin.

Cabin air intake can be arranged in the upper part of the cabin and the cabin air extraction in the lower part of the cabin, so that a downwards directed air flow is achieved inside the cabin. Thus, the generated air flow will follow and reinforce that surplus material from or waste material generated in connection with the processing will fall to the bottom, so that the area which is to undergo spot treatment is not contaminated.

In embodiments, the method according to the invention characterised in that the method comprises steps for

- providing the mobile cabin as per the embodiments described herein,
- placement of the cabin close to object which is to undergo spot processing with the open side oriented towards the object,
- covering of the area between the object and the cabin's outlined edge area towards the open side,
- linking the cabin air extraction to an extraction system,
- activation of the cabin air extraction,
- provide a processing unit inside the cabin,
- a person guides the arms through the arm access holes and performs, in a standing or sitting position outside the cabin, a processing inside the cabin of the area, which is to undergo spot processing, while the person simultaneously has visual control of the spot processing through one or more windows.

The cabin according to embodiments of the invention is a simple construction which can easily be placed inside workshops with limited requirements for air extraction and similar, as it is known from traditional cabins, wherein an object, a car for instance, is placed inside the cabin during the processing.

When in use, the cabin constitutes a closed cabin where the surface which is to undergo processing both constitutes a side of the cabin and simultaneously is available for processing inside the cabin. A cabin which can be operated from the outside.

In this description the covering and shielding likewise comprise masking and sealing.

In the following description, the expression "a smaller area" refers to an outlined area or subarea of a surface.

The cabin air intake can facilitate a filtrated air intake. This can be achieved by the cabin air intake comprising a particle filter.

The technical effect achieved with embodiments of the invention is easy and effective spot processing of surface parts with limited space requirements and with reduced extraction, as well as an environmental benefit, in that the person who oversees the processing, is not required to stay inside the cabin itself.

In principle, the mobile cabin will, in its construction, comprise the area which is encased by bottom, top, sides, as well as the covering sheet. When in use, the cabin thus makes up a closed cabin.

Due to its flexibility the covering sheet can accommodate different forms of surfaces and will therefore, with ease, be able to be placed into sealing arrangement against the surface of a car for instance. In a traditional manner, this can be done by taping the covering sheet on to the car's surface. Likewise, the covering sheet can be taped on to the outlined edge area on the cabin. The covering sheet can thus easily be replaced and substituted with a new covering sheet. Alternatively, the covering sheet can be assembled more firmly on the cabin's outlined edge area, so that it can be reused several times. In such a case, the fastening can be achieved with for example clamp rails which fastens an edge area on the covering sheet.

The covering sheet can be manufactured from different suitable materials for a given application, such as plastic.

The covering sheet can be supplied with channels which can contain bracing tubes, such as it is known from tents as an example. Thus, the covering sheet can in an easy manner maintain a stretched condition, which eases the assembly on to the item that is to undergo spot processing.

Bottom plate, sidewalls, and top plate are embodied as fixed parts and mounted together, so that they establish an airtight unit. When in use, the cabin will thus be operated with an airflow through the cabin from the cabin's air intake to its air extraction and with a vacuum, so that emissions from the cabin itself and into its surroundings do not occur. Moreover, the cabin's air intake will take place through the cabin's air inlet so that a controlled airflow inside the cabin is achieved.

By providing the cabin with windows, the person standing outside the cabin will be able to conduct a spot processing and simultaneously receive visual information regarding the execution of the work. By having the person placed outside the cabin, there is no need for respiratory protection or the like. The person's arms, which are led through the arm access holes, will be in close arrangement with the flexible material. This can for example be elastic cuffs with a star-shaped opening, which ensures both a close fit around the user's arms and at the same time avoid that a bothersome or restraining influence on the execution of the work. Alternatively, the user's arms can be covered with elongated bag-shaped gloves, so that the arms, which are inside the cabin, are covered by these bag-shaped gloves. As a result, the person performing the work will not get into contact with materials, fumes, sparks, or other diverted material/phenomena, that are either released or occur in connection with the spot processing.

The extraction happens in a traditional manner, with the cabin being connected to an extraction system. This can for example take place through a flexible tube. Alternatively, the cabin air extraction can be provided at the bottom of the cabin between a perforated plate and a sealed bottom plate, producing a chamber. This chamber can then be provided with a flexible hose which leads the air into a traditional extraction system, which can be placed at a distance from the cabin and ensure that the extracted air is handled in accordance with environmental requirements.

Once the spot processing has been carried out, the cabin can easily be detached from the item/car and transported away, as it is supplied with wheels. The wheels enable an easy relocation of the cabin, so that it can easily and quickly be taken to another item or car, which is to undergo processing. Alternatively, the cabin can be moved to a designated area in a workshop, where it will take up very little space when not in use.

The wheels are thus adapted to displace the cabin on a horizontal foundation.

According to an embodiment the cabin according to the invention is characterized in that the cabin air inlet comprises the opening in the upper part of the cabin, for example in a top plate at the top of the cabin.

In the cabin the cabin air inlet can solely be constituted by a perforated plate that is possibly provided with a filter element, and which is placed in the upper part of the cabin. Thereby, the air can be drawn in from the top in a traditional manner, which likewise applies to traditional cabins.

According to an embodiment the cabin is characterized in that the cabin air extraction is provided in the lower part of the cabin and comprises a flexible tube connected to the extraction system.

The cabin air extraction is provided in the lower part of the cabin like in traditional cabins. The cabin air extraction comprises a flexible tube which can connect the cabin to an extraction system. The extraction system can be a traditional system, such that there is no active extraction inside the cabin itself, whereas a chamber between a perforated plate and a lowermost bottom in the cabin is created. Surplus material from or waste material generated in connection with the processing will fall to the bottom and thus the extraction will be more effective when performed at the bottom of the cabin.

According to an embodiment, the cabin is characterized in that the cabin air extraction comprises openings in a bottom plate at the bottom of the cabin, and that a chamber beneath the bottom plate is connected to the flexible tube.

As mentioned above, it may be advantageous in embodiments that a chamber can be placed at the bottom of the cabin. If a bottom plate with openings is provided, a chamber will be created, whereto the flexible tube can be connected in order to perform an efficient extraction of polluted air from the cabin.

According to an embodiment, the cabin is characterized in that at least one of the other sidewalls is curved and comprises a curved window.

As a result of the other sidewalls, which comprise the windows, being curved, the windows can likewise be curved. This enables a better view into the cabin, where a person performing the spot processing can observe the area undergoing treatment from multiple angles.

According to an embodiment, the cabin is characterized in that at least one of the other sidewalls comprises more sidewall parts, which are placed among themselves to establish several side surfaces in the cabin.

As an alternative to a curved sidewall, one of the other sidewalls can be formed from more sidewall parts. These sidewall parts can be flat or curved. By providing more sidewall parts, placed under an angle in relation to each other, a multiangular outline of the cabin is achieved, which facilitates an inspection of the area that us to undergo treatment from multiple angles.

According to an embodiment, the cabin is characterized in that several of the sidewall parts are supplied with windows.

When several sidewall parts are provided, it may be advantageous in embodiments that several of these sidewall parts are supplied with windows to ensure a view of the area which is to undergo treatment from multiple angles.

According to an embodiment, the cabin is characterised in that the covering sheet is assembled on the outlined edge area with tape, and that the sealing means at the covering sheet's free edge area comprise tape.

As mentioned earlier, tape is an expedient way to fasten the covering sheet to the outlined edge area, just as it is an expedient sealing compound and fastening compound against the surface which is to undergo treatment/processing. As mentioned above, the covering sheet does not have to be assembled with tape to the item as well as at the free edge area on the cabin.

For example, by utilizing tape, a shielding which by and large corresponds to traditional shielding of an area, which is used in traditional spot painting, is achieved.

Shielding comprises demasking, sealing, and covering.

According to an embodiment, the cabin is characterized in that a seat meant for the person performing the spot processing, is assembled at the cabin's exterior.

By placing a seat at the exterior, a comfortable position for a user performing the spot processing, is achieved. Thus, the person can adjust the seat in height and in distance from the cabin, so that a good view into the area that is to undergo processing is achieved, just as a good positioning for the person's placement in relation to the arm access holes can be achieved.

The purpose of embodiments of the invention can be achieved through the use of the mobile cabin in accordance with the described embodiments for spot processing, where the spot processing relates to welding and where one or more windows in the cabin are designed in a material with this application in mind.

The windows can thus be designed from welding glass or another material with similar built-in safety parameters, where the cabin's user maintains a visual insight into the cabin.

The air extraction in the cabin can likewise be adapted to this application. Thus, it can further be ensured that fumes do not accumulate in the cabin, which hinders a view into the cabin during the work or which are released when the cabin is disconnected from the item undergoing treatment.

The purpose of embodiments of the invention can be achieved by using the mobile cabin in accordance with the described embodiments for spot processing, where the spot processing concerns metal polishing and where the windows in the cabin are designed in a material with this application in mind.

The air extraction in the cabin can likewise be adapted to this application. Thus, it can further be ensured that metal dust does not appear in the cabin, which hinders a view into the cabin during the work or which is released when the cabin is disconnected from the item undergoing treatment.

The windows can thus be designed with a scratch free surface on the side facing the cabin, or from a scratch free material, so that the user of the cabin is ensured a visual insight into the cabin, even after repeated use of the cabin.

The purpose of embodiments of the invention can be achieved through the use of the mobile cabin in accordance with the described embodiments for spot treatment, where the spot treatment relates to painting, and where the air extraction in the cabin is adapted with this application in mind.

The cabin air extraction can be adjusted to ensure that toxic fumes do not accumulate inside the cabin, which are released when the cabin is disconnected from the item undergoing treatment.

Furthermore, the aspect of embodiments of the invention is achieved with a cabin system for spot processing of an area on a surface, for example a car or other objects, characterised in that the cabin system comprises a mobile cabin in accordance with one of the embodiments described above and a filter unit.

The cabin's air extraction is adapted to be connected to the filter unit.

The filter unit comprises air extraction, one or more filters, and one or more air inlets, and where each air inlet is adapted to connect to the mobile cabin, so that the filter unit is configured to be arranged in fluid communication with the mobile cabin.

The cabin system is a simple construction which can easily be placed in workshops with limited or no ventilation requirements or the like, such as it is known from traditional cabins where an item, such as a car, is placed inside the cabin during the processing.

The technical effect which is achieved with the cabin system is easy and effective spot processing of surface parts with limited space requirements and without access to filtered air extraction, or where the extraction capacity is limited. Furthermore, an environmental benefit can be achieved, in that the person carrying out the processing, is not required to stay inside the cabin itself.

According to an embodiment of the cabin system, the filter unit comprises wheels which enables easy relocation of the filter unit.

The portability of the filter unit has the same benefits as the portability of the cabin.

The already described technical effects and benefits achieved with a mobile cabin according to the described embodiments can, in general, also be achieved with the cabin system comprising a mobile cabin with the same embodiment. In the following, as a rule, the additional effects and benefits achieved with the cabin system are presented.

According to an embodiment of the cabin system, the mobile cabin's cabin air extraction and the filter unit's air inlet comprise tube connections configured for assembly of a tube-like connection between the mobile cabin and the filter unit.

In the cabin system, the extraction can take place by connecting the cabin to the filter unit through a flexible tube, which can be connected to the cabin's air extraction and an air inlet on the filter unit respectively.

The cabin air extraction can be provided at the bottom of the cabin between a perforated plate and a sealed bottom plate, which produce a chamber. This chamber can then be provided with a flexible hose which leads the air to the filter unit.

By using a flexible hose or tube, the filter unit can be placed at a given distance from the cabin so that the workplace's layout can be optimised. Likewise, it can be assured that the extracted air is handled in accordance with environmental requirements.

According to an embodiment of the cabin system, the filter unit comprises a ventilator assembled in connection with the air extraction, so that an air flow through the cabin and/or the filter unit from the cabin's cabin air inlet or from the filter unit's air inlet to the filter unit's air extraction is achieved.

By arranging the ventilator in connection with the air extraction in the cabin, the risk turbulence inside the cabin and thus risk of polluting the subject, which is to undergo spot processing, is reduced. Likewise, a smaller vacuum inside the chamber is created, which can be an advantage in securing better sealing between the subject and the covering sheet.

The same effect within the filter unit can secure a more laminar airflow through the filters, which may be advantageous in embodiments in order to utilise the filter in an optimal manner.

The filter unit can comprise several inlets and/or several filters, so that the filter unit can be adjusted for a specific application. Alternatively, the filter unit with multiple inlets can be adjusted to several uses by connecting a given filter to a specific inlet, where the filter is configured for a specific application.

According to an embodiment of the cabin system the filter unit comprises an activated carbon filter.

In an embodiment, the filter or one of the filters can be constituted by a high energy activated carbon filter with a plurality of filter bags, so that it also functions as a particle filter.

According to an embodiment the filter unit comprises a VOC-sensor arranged after the filters and in connection with the air extraction for measuring of transient organic connections in the air flow out of the filter unit's air extraction. The VOC-sensor is configured to emit a sensor signal, indicating a level of the amount of VOC in the air flow.

The cabin system in this embodiment can likewise comprise a control configured to receive the sensor signal from the VOC-sensor and configured to emit an alarm signal as a function of the measured VOC-level.

Alternatively, the filter unit comprises a plurality of sensors or other types of sensors for measuring other parameters, such as air velocity, particle content, and so on.

By monitoring the VOC-level in the air extraction the cabin system can be operated with a control to emit a tactile alarm and/or cut off the power supply to processing units that are in use and that can cause an increased VOC-level.

Alternatively, when for example using a sensor to measure the air velocity, the control can give off a signal on whether there is a risk of explosion, if the air replacement inside the cabin is too low. This could, for example, be caused by blockage of the fluid connection between the cabin and the filter unit, blocked filters, and so on.

The tactile alarm could be in the form of a visual and/or auditory indicator.

According to an embodiment the cabin system comprises one or more mobile cabins and one or more filter units, where the filter units comprise one or more air inlets so that a scalable cabin system is achieved.

Furthermore, the aspect of embodiments of the invention is achieved with a method for spot processing in accordance with one of the embodiments described above, by providing a cabin system according to embodiments described above, and where the cabin's cabin air extraction is connected to a filter unit.

The scalable cabin system can, be adjusted to multiple uses by adjusting the cabins for use in a specific type of spot processing and connecting the cabin to a filter unit, where the filter is configured to the corresponding use. This could, for instance, be for a cabin for “clean” use, for example painting or lacquering, and a filter unit with an activated carbon filter for cleaning the extraction air from the system of volatile organic compounds (VOC).

The aspect of embodiments of the invention can furthermore be achieved through use of the cabin system in accordance with the described embodiments for spot processing, where the spot processing relates to welding, metal polishing, cutting, and/or painting.

BRIEF DESCRIPTION

Some of the embodiments will be described in detail, with references to the following Figures, wherein like designations denote like members, wherein:

FIG. 7 illustrates a second perspective image corresponding to FIG. 5 of the embodiment illustrated in FIG. 6 viewed from behind, looking into the cabin;

FIG. 8 illustrates a first perspective image of a further embodiment for the cabin viewed from the side in a sectional view through the cabin;

FIG. 9 illustrates a second perspective image of the embodiment shown in FIG. 8 viewed from the front, showing the cabin from the user's position;

DETAILED DESCRIPTION

Figure 1:
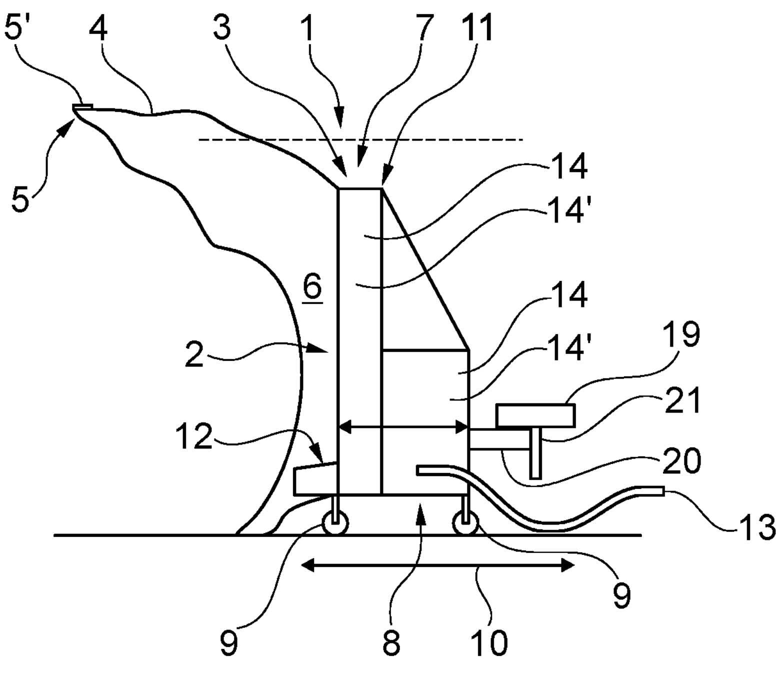
FIG. 1 illustrates a side image of a cabin according to embodiments of the invention, where the covering sheet is shown in a partially stretched condition for illustrating contact with an irregular surface.
Figure 2:
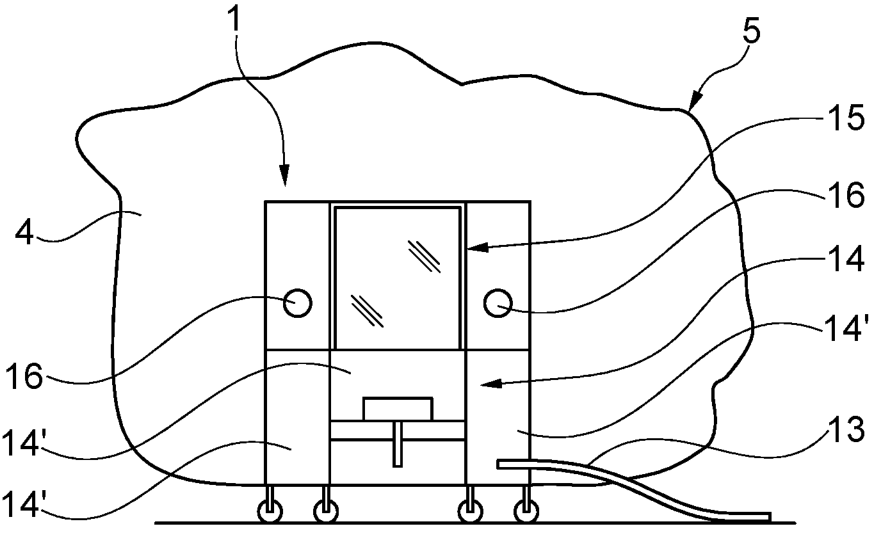
FIG. 2 illustrates an image of the cabin in FIG. 1 viewed from the right in FIG. 1.
Figure 3:
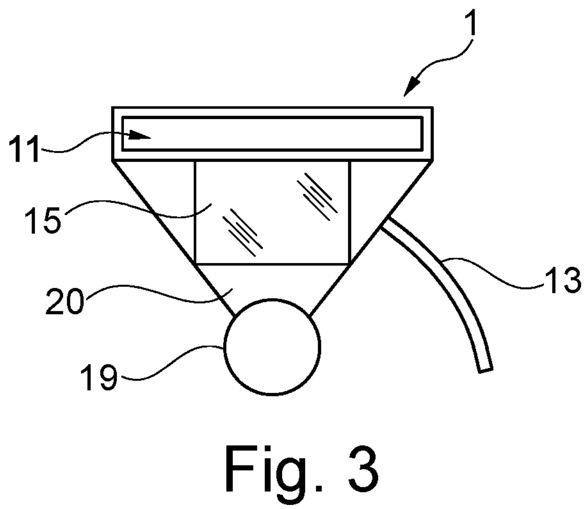
FIG. 3 illustrates an image of the in FIG. 1 illustrated cabin viewed from above, but here without covering sheet.

FIGS. 1-3 illustrate a schematic image of a cabin 1. This is meant for spot processing of smaller areas on a surface of a car (not shown) or other objects.

The cabin 1 is provided with a first side 2, where a flexible covering sheet 4 is fastened along an outlined edge area 3. The flexible covering sheet 4 can be brought into arrangement against the surface that is to undergo a spot processing. The covering sheet 4 is at its free edge area 5 supplied with sealing compounds in the form of tape 5', which can establish a sealing arrangement against the surface. Thus, an area 6, which contains a smaller area that is to undergo spot processing on its surface, is enveloped.

The cabin comprises other sides 14 as well as a top 7 and a bottom 8. At the bottom 8, wheels 9 are assembled for easy transportation of the cabin, as indicated at the arrow 10. The sides 14 comprise other sidewalls 14'. At the top 7 there is a top plate 22 (see FIGS. 4 and 5) provided with openings 23 (see FIGS. 4 and 5) to establish an air inlet 11. At the bottom there is an air extraction 12 (see FIGS. 4 and 5), that via a flexible tube 13 is adapted to be connected to an extraction system (not shown).

In the other sidewalls 14', windows 15 are provided. The windows 15 make it possible for an operator standing outside of the cabin to monitor the work that is being performed with a processing unit inside the cabin. The other sidewalls 14' are likewise provided with arm access holes 16, which make it possible for the person to stand outside the cabin and hold the arms inside the area 6, where processing is taking place. The person can thus perform the work without the need for protective equipment.

Figure 4:
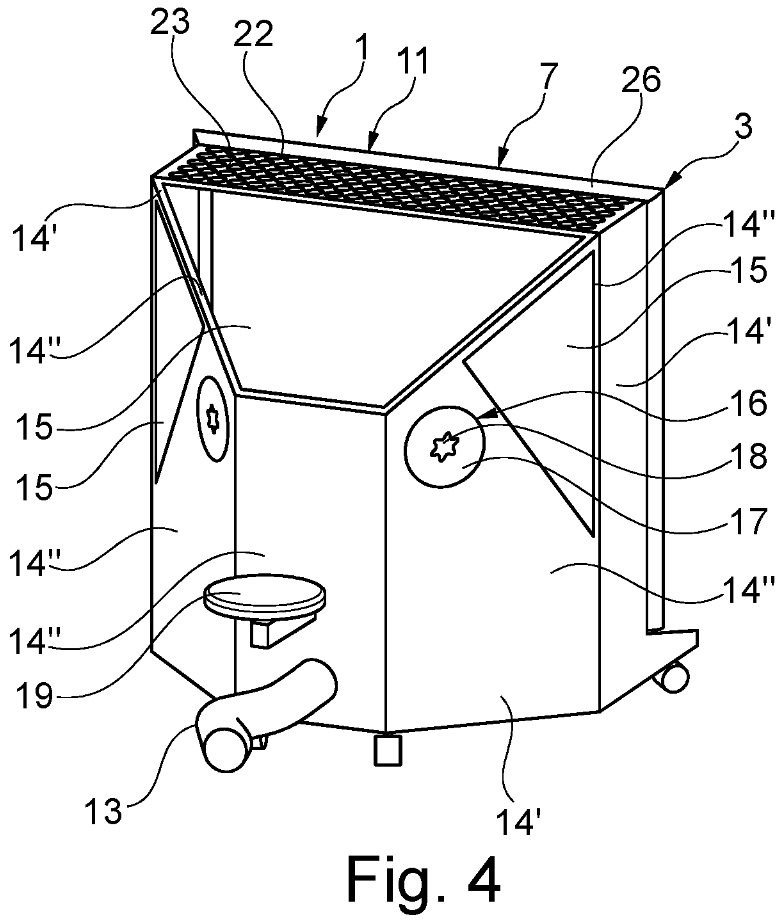
FIG. 4 illustrates a first perspective image of the cabin viewed from the front.

As it particularly clearly appears in FIG. 4, the arm access holes 16 are provided with a cuff 17 which has a star shaped opening 18, and which is made from a flexible material. It is thus easy for a user to lead the arm through the opening 18 and because of the flexible material of the cuff 17, a close fit around the user's arms is secured. As a result, there is no risk of polluted air escaping out through the openings 18.

At the cabin's front side 14 a seat 19 is assembled on the sidewall 14'. The seat is assembled on an arm 20, which enables a displacement of the seat 19 in a direction towards and away from the cabin's frontal sidewall 14'. The seat is assembled on a vertical spindle 21 which enables a height adjustment of the seat 19. Hereafter, a user can be seated and maintain a correct position in relation to the arm access holes 16 and the window 15 for visual inspection of the work being carried out inside the cabin.

Figure 5:
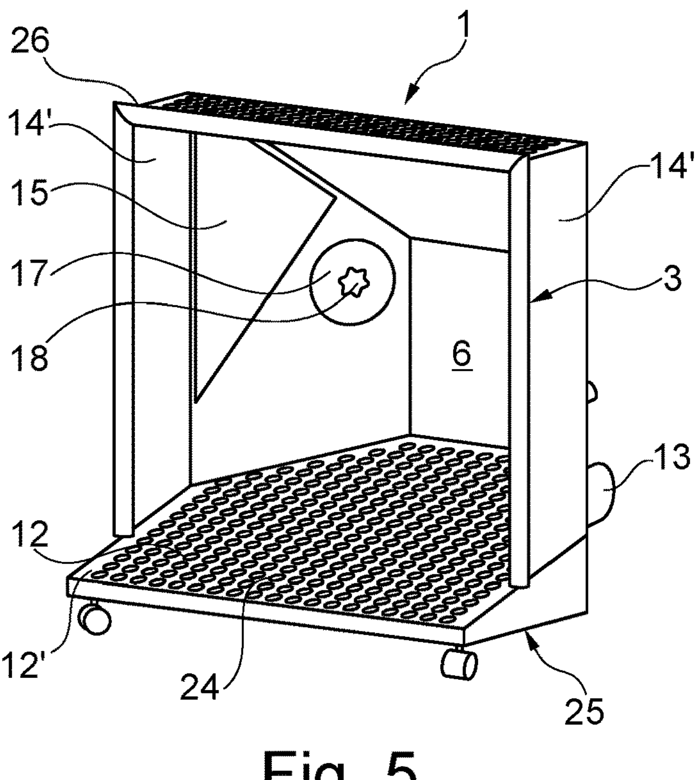
FIG. 5 illustrates a second perspective image of the cabin viewed from behind, looking into the cabin.

In FIGS. 4 and 5, a magnified image with more details of the cabin illustrated in FIGS. 1-3 is seen. It is seen that a perforated top plate 22 with several openings 23 is situated at the top 7, which enables air inlet. In this plate a filter can be provided, but alternatively, there can merely be openings 23 which bring the inner area 6 into contact with the surrounding air to allow for free air inlet.

In FIG. 5 it is seen that a cabin air extraction 12 is provided with a perforated bottom plate 12' with several openings 24. This brings the inner area 6 in connection to a chamber located beneath the bottom plate 12' and in a lowermost bottom plate 25 in the cabin. This chamber (not shown) is connected with the flexible tube 13.

In FIGS. 4 and 5, it is seen that the outlined edge area 3 is provided with fastening means in the form of clamp rails 26 which enables a close fit for the covering sheet to the outlined edge area 3. Shielding rails are only shown along the top plate 22 and the sidewalls 14'.

In FIGS. 4 and 5, it is seen that the frontal sidewall 14' is made up of several sidewall parts 14". These sidewall parts 14" are placed at a mutual angle, such that more side surfaces are formed inside the cabin. It is seen that windows 15 are provided in three of the sidewall parts 14". Hereby, the user can inspect the inner portion of the cabin from several angles.

Figure 6:
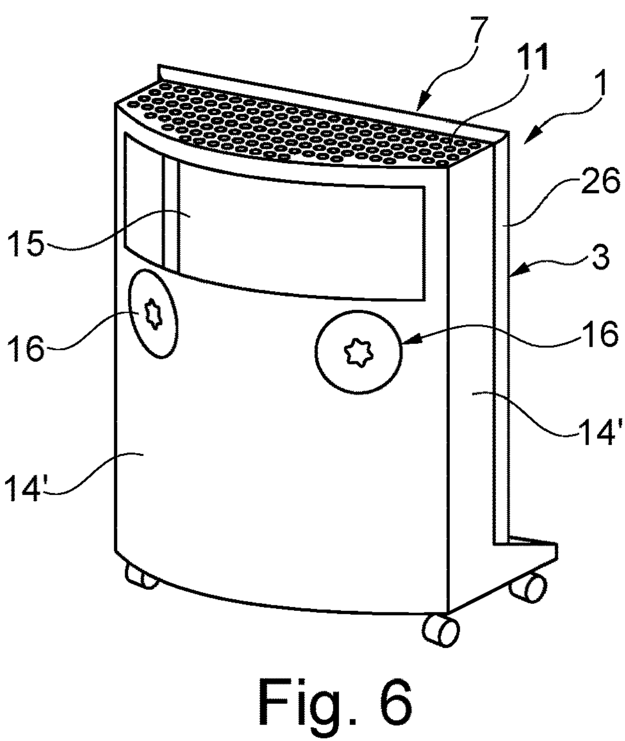
FIG. 6 illustrates a first perspective image corresponding to FIG. 4 of a further embodiment of the cabin viewed from the front.

In FIGS. 6 and 7, an alternative embodiment for a cabin 1 is illustrated. The cabin 1 in this embodiment differentiates itself by not comprising a seat and that the sidewall 14' at the cabin's front is provided with a curved shape. The window 15 will likewise be curved in this embodiment. The curved window facilitates a visual inspection of the paintjob from several angles.

Alternatively, the frontal sidewall 14' can be flat and comprise a flat window 15.

In FIGS. 6 and 7, the flexible tube is omitted, though such a tube will also be provided for air extraction from the cabin, which is illustrated in FIGS. 6 and 7.

When the cabin's front is mentioned in the present application, this refers to the side on which the person who is performing the processing is placed. This means that the expression "from behind" refers to the side of the cabin facing towards the item which is to undergo processing.

In FIGS. 8 and 9 an alternative embodiment of a cabin 1 is illustrated. The cabin 1 in this embodiment differentiates itself by not comprising a seat and that the arm access holes 16 have a different design and placement. The illustrations in FIGS. 8 and 9 further illustrate an example of how the cabin can be implemented with ventilator assembled in connection with the cabin air extraction, so that an air flow is achieved through the cabin from the cabin's air inlet and in through the opening 23 into the cabin's air extraction 12.

FIG. 9 further illustrates an embodiment of the cabin with tube connection configured for assembly of a tube-like connection between the mobile cabin and the filter unit, here the tube-like connection is illustrated by a flexible tube 13.

Figure 10:
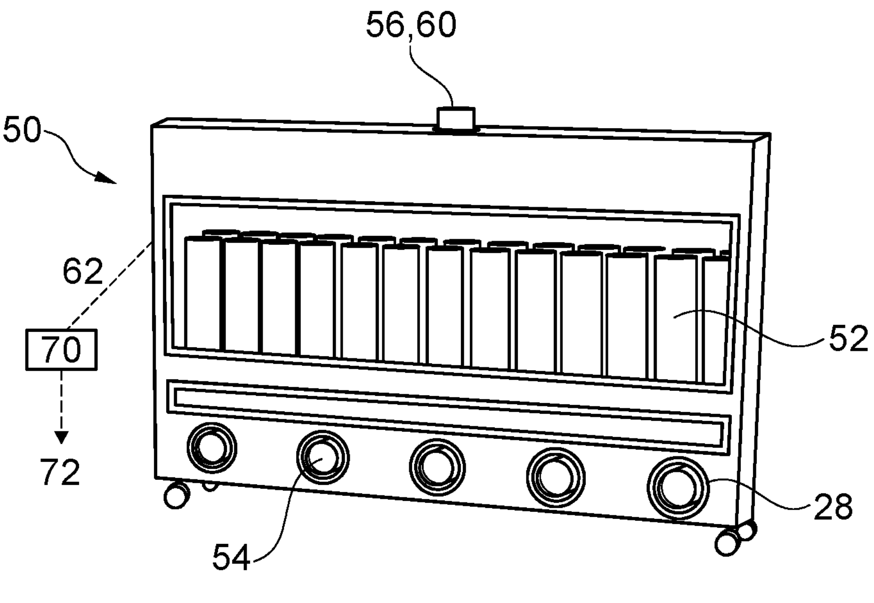
FIG. 10 illustrates a perspective image of a filter unit according to embodiments of the invention, where the filters contained within the filter unit appear.
Figure 11:
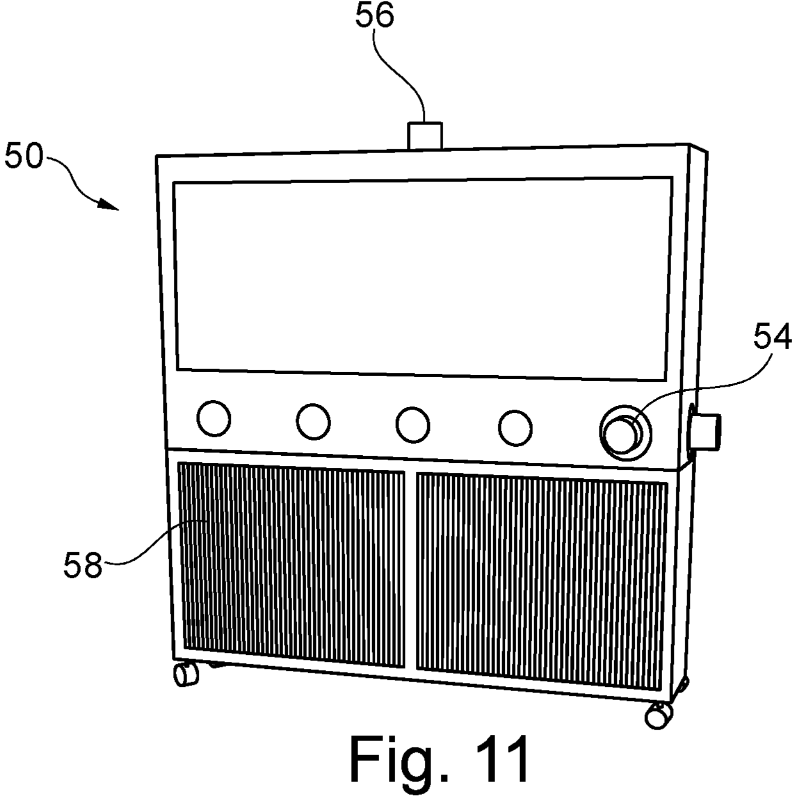
FIG. 11 illustrates a perspective image of a further embodiment of the filter unit with a cover plate assembled over the filters and a filtering wall.

In FIGS. 10 and 11 two alternative embodiments for a filter unit 50 are illustrated. The filter units are configured to be assembled in fluid communication with the cabin 1 via the air extraction 54.

The filter units comprise one or more filters 52 which can be active, replaceable, and/or self-cleaning.

The filter units can be designed with filters suited for specific uses, for instance activated carbon filters to clean the air of VOC-connections or particle filters, just to mention a few, though without limiting which filters can be used.

The illustrated embodiments likewise comprise air extraction 56 and in connection with both air inlet 54 and air extraction 56 a tube connection 28 is assembled. The tube connection at the air extraction 56 is not essential for the cabin system, as the extracted air is cleansed and thus can be led directly out in the environment, in which the cabin system is being used. Alternatively, the cabin system can be connected to an external extraction system. The filter system can comprise a ventilator assembled in connection with the air extraction 56, so that an air flow through the filter unit from the air inlet 54 and to the air extraction 56 is achieved. Alternatively, the filter unit can be connected to an external extraction system which generates the air flow.

The filter unit in FIG. 10 is illustrated with a sensor 60. In the illustrated embodiment, the sensor is arranged after the filters 52 and in connection with the air extraction 56. The sensor can be a VOC-sensor for measuring transient organic connections in the air flow out of the filter unit's air extraction. The sensor can, alternatively, be adapted to measure air velocity, particle content, or the like, in relation to the cabin system's intended application. Alternatively, the filter unit can comprise multiple sensors.

The sensor is configured to emit a sensor signal 62 which indicates a measurement value or level, for example a threshold for the amount of VOC in the air flow, a threshold for a minimum air flow, or the like.

Furthermore, the cabin system can comprise a control 70 configured to receive the sensor signal 62 from the sensor 60, and further configured to emit an alarm signal 72.

The alarm signal 72 can be an electronic signal which is used to control a work unit, which is utilised in a cabin linked to the filter unit. The alarm signal can, for example, be used to turn off the work unit. For example, the cabin system can be configured for use in lacquering a surface, where the sensor is a VOC-sensor, and where the system must turn off a spray gun, if the measured VOC-contents in the extracted air exceeds a predetermined threshold.

In FIG. 10 the control is illustrated in connection with the filter unit. The control can be implemented in the cabin, the filter unit, or in the system as an independent unit.

The filter unit in FIG. 10 is illustrated as comprising a plurality of air inlets, which enables linking a plurality of cabins and/or that a cabin, which can be used for several purposes, can be linked a first air inlet for the first application and a second air inlet with a second application, if the filter unit is divided into different filters designed for specific air inlets and applications. Thus, a scalable cabin system with one or more filter units, and one or more cabins, is achieved.

The filter unit 50 in FIG. 11 differs from the one in FIG. 10 by comprising filtration wall 58. The filter unit 50 is illustrated with a cover plate assembled over the filters 52. The filtration wall can ensure that the filter unit can be used as a self-contained filter unit, such that a further application of the filter unit, for example for continuous cleansing of the surrounding air in a workspace, is achieved.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A mobile cabin for spot processing of an area of a surface, wherein the mobile cabin comprises:

a cabin with sides, bottom, and top, where a first side is an open side and where a covering sheet made from a flexible material is assembled along an outlined edge area of the open side and facing the open side, which covering sheet can be brought into arrangement against a surface, where an area of the surface is to undergo spot processing, which covering sheet at a free edge area has an edge area provided with sealing compounds configured to establish a sealing arrangement against the surface, which envelops the area which is to undergo spot processing, and where the other sides comprise sidewalls, so that a closed cabin is achieved when in use, cabin air inlet arranged in the upper part of the cabin, wheels, which facilitates easy relocation of the cabin, one or more windows, provided in at least one of the sidewalls for visual insight into the cabin, and wherein the mobile cabin includes cabin air extraction, arranged in the lower part of the cabin and configured to be connected to an air extraction system, and arm access holes, provided in one or more of the sidewalls and provided with flexible material for a tight fit around a person's arms when standing outside of the cabin.

2. The mobile cabin according to claim 1, wherein the cabin air inlet comprises an opening in the upper part of the cabin.

3. The mobile cabin according to claim 1, wherein the cabin air extraction is provided in the lower part of the cabin and comprises a flexible tube, connected to the extraction system.

4. The mobile cabin according to claim 1, wherein at least one of the sidewalls comprise several sidewall parts, which are placed among themselves to establish several side surfaces in the cabin.

5. The mobile cabin according to claim 1, wherein the covering sheet is assembled on the outlined edge area of the open side with tape, and that the sealing compounds at the covering sheet's free edge area comprise tape.

6. The mobile cabin according to claim 1, wherein the cabin comprises a ventilator assembled in connection with the cabin air extraction.

7. A cabin system for spot processing of an area of a surface, wherein the cabin system comprises the mobile cabin according to claim 1 and a filter unit, where the cabin air extraction is configured be connected to the filter unit and where the filter unit comprises a filter air extraction, a plurality of filters, and a plurality of air inlets, and where each air inlet of the plurality of air inlets is configured for connection to the mobile cabin, so that the filter unit is configured to be arranged in fluid communication with the mobile cabin.

8. The cabin system according to claim 7, where the filter unit comprises wheels, which enables easy transportation of the filter unit.

9. The cabin system according to claim 7, wherein the cabin air extraction and the plurality of air inlets comprise tube connections configured for assembly of a tube-like connection between the mobile cabin and the filter unit.

10. The cabin system according to claim 7, wherein the filter unit comprises a ventilator assembled in connection with the filter air extraction, so that an air flow through the cabin and/or the filter unit from the cabin air inlet or from the plurality of air inlets to the filter air extraction is achieved.

11. The cabin system according to claim 7, wherein the filter unit comprises activated carbon filter.

12. The cabin system according to claim 7, wherein the filter unit comprises a VOC-sensor arranged downstream from the filters and in connection with the filter air extraction for measurement of transient organic connections in the air flow out of the filter air extraction and configured to emit a sensor signal, which indicates a level of the amount of VOC in the air flow, and that the cabin system comprises a control configured to receive the sensor signal from the VOC-sensor and configured to emit an alarm signal.

13. A method for spot processing of a smaller area on a surface, wherein the method comprises:

providing the mobile cabin according to claim 1, placement of the cabin close to an object which is to undergo spot processing with the open side oriented towards the object, covering of the area between the object and the cabin's outlined edge area towards the open side, linking the cabin air extraction to the air extraction system, activation of the cabin air extraction, providing a processing unit inside the cabin, accessing the area through arm access holes and performing a spot processing inside the cabin of the area, which is to undergo spot processing, wherein one or more windows allow for visual control of the spot processing.

14. The method for spot processing according to claim 13, wherein the mobile cabin is part of a cabin system including a filter unit, and wherein the cabin air extraction is connected to the filter unit.

* * * * *